US008630528B2

(12) United States Patent
Kauffman et al.

(10) Patent No.: US 8,630,528 B2
(45) Date of Patent: *Jan. 14, 2014

(54) METHOD AND SYSTEM FOR SPECIFYING A SELECTION OF CONTENT SEGMENTS STORED IN DIFFERENT FORMATS

(75) Inventors: Steven V. Kauffman, San Jose, CA (US); Rainer Richter, San Jose, CA (US); Jane K. Doong, San Jose, CA (US); Lara M. Lewis, San Jose, CA (US); Chiunn-shyong Yeh, San Jose, CA (US); John Ying, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1617 days.

This patent is subject to a terminal disclaimer.

(21) Appl. No.: 11/777,937

(22) Filed: Jul. 13, 2007

(65) Prior Publication Data

US 2007/0297757 A1  Dec. 27, 2007

Related U.S. Application Data

(63) Continuation of application No. 09/829,676, filed on Apr. 9, 2001, now Pat. No. 7,280,738.

(51) Int. Cl.
*H04N 5/92* (2006.01)

(52) U.S. Cl.
USPC .......................................... 386/241; 386/248

(58) Field of Classification Search
None
See application file for complete search history.

(56) References Cited

U.S. PATENT DOCUMENTS

| 4,939,585 | A | | 7/1990 | Kawaguchi et al. |
| 5,159,503 | A | | 10/1992 | Mitamura et al. |
| 5,206,929 | A | * | 4/1993 | Langford et al. ............. 715/723 |
| 5,237,648 | A | * | 8/1993 | Mills et al. ................... 715/723 |
| 5,414,455 | A | | 5/1995 | Hooper et al. |
| 5,442,749 | A | | 8/1995 | Northcutt et al. |
| 5,526,024 | A | | 6/1996 | Gaglianello et al. |
| 5,537,530 | A | | 7/1996 | Edgar et al. |
| 5,559,562 | A | | 9/1996 | Ferster |
| 5,583,868 | A | | 12/1996 | Rashid et al. |
| 5,596,565 | A | | 1/1997 | Yonemitsu et al. |
| 5,732,184 | A | | 3/1998 | Chao et al. |
| 5,740,388 | A | | 4/1998 | Hunt |
| 5,758,180 | A | | 5/1998 | Duffy et al. |

(Continued)

FOREIGN PATENT DOCUMENTS

| CA | 2 239 317 | | 11/1998 |
| JP | 09-065303 | A | 3/1997 |
| JP | 11-136631 | A | 5/1999 |
| JP | 2000-092433 | A | 3/2000 |

OTHER PUBLICATIONS

Sull et al., System and Method for Multimedia Bookmarking, Jul. 28, 2000; U.S. 60/221,843.*

*Primary Examiner* — Huy T Nguyen
*Assistant Examiner* — Eileen Adams
(74) *Attorney, Agent, or Firm* — Sughrue Mion, PLLC

(57) ABSTRACT

A method, system and program product are described for specifying a selection of content segments stored in different formats. The invention involves receiving specification of a plurality of portions of first content stored in a first format, the specification identifying beginning and ending frames for each portion, and building a list comprising a starting mark and ending mark for each selected portion of first content, the list for use in accessing corresponding portions of the same content stored as second content in a second format.

33 Claims, 9 Drawing Sheets

(56) References Cited

U.S. PATENT DOCUMENTS

| | | |
|---|---|---|
| 5,801,685 A | 9/1998 | Miller et al. |
| 5,815,689 A | 9/1998 | Shaw et al. |
| 5,818,539 A | 10/1998 | Naimpally et al. |
| 5,825,892 A | 10/1998 | Braudaway et al. |
| 5,862,450 A | 1/1999 | Mandal et al. |
| 5,884,056 A | 3/1999 | Steele |
| 5,903,563 A | 5/1999 | Rashid et al. |
| 5,929,850 A | 7/1999 | Broadwin et al. |
| 5,930,445 A | 7/1999 | Peters et al. |
| 5,933,834 A | 8/1999 | Aichelen |
| 5,956,716 A | 9/1999 | Kenner et al. |
| 5,991,373 A | 11/1999 | Pattison et al. |
| 5,996,015 A | 11/1999 | Day et al. |
| 6,029,194 A | 2/2000 | Tilt |
| 6,044,365 A | 3/2000 | Cannon et al. |
| 6,075,576 A | 6/2000 | Tan et al. |
| 6,079,566 A | 6/2000 | Eleftheriadis et al. |
| 6,151,017 A | 11/2000 | Suzuoka et al. |
| 6,211,869 B1 | 4/2001 | Loveman et al. |
| 6,215,523 B1 | 4/2001 | Anderson |
| 6,281,874 B1 | 8/2001 | Sivan et al. |
| 6,321,024 B1 * | 11/2001 | Fujita et al. .................. 386/281 |
| 6,360,234 B2 | 3/2002 | Jain et al. |
| 6,462,753 B1 * | 10/2002 | Koyata et al. ................. 715/716 |
| 6,504,552 B2 | 1/2003 | Phillips |
| 6,600,869 B1 | 7/2003 | Chen et al. |
| 6,870,887 B2 | 3/2005 | Kauffman et al. |
| 6,944,390 B1 | 9/2005 | Eubanks |
| 7,280,738 B2 * | 10/2007 | Kauffman et al. ............ 386/281 |
| 2002/0069218 A1 * | 6/2002 | Sull et al. .................... 707/501.1 |

\* cited by examiner

EDL 31

| VIDEOID | STARTING FRAME No. | ENDING FRAME No. |
|---|---|---|
| 01 | 1001 | 1132 |
| 01 | 528 | 601 |
| 05 | 44 | 92 |
| 12 | 2255 | 2600 |
| 07 | 144 | 519 |

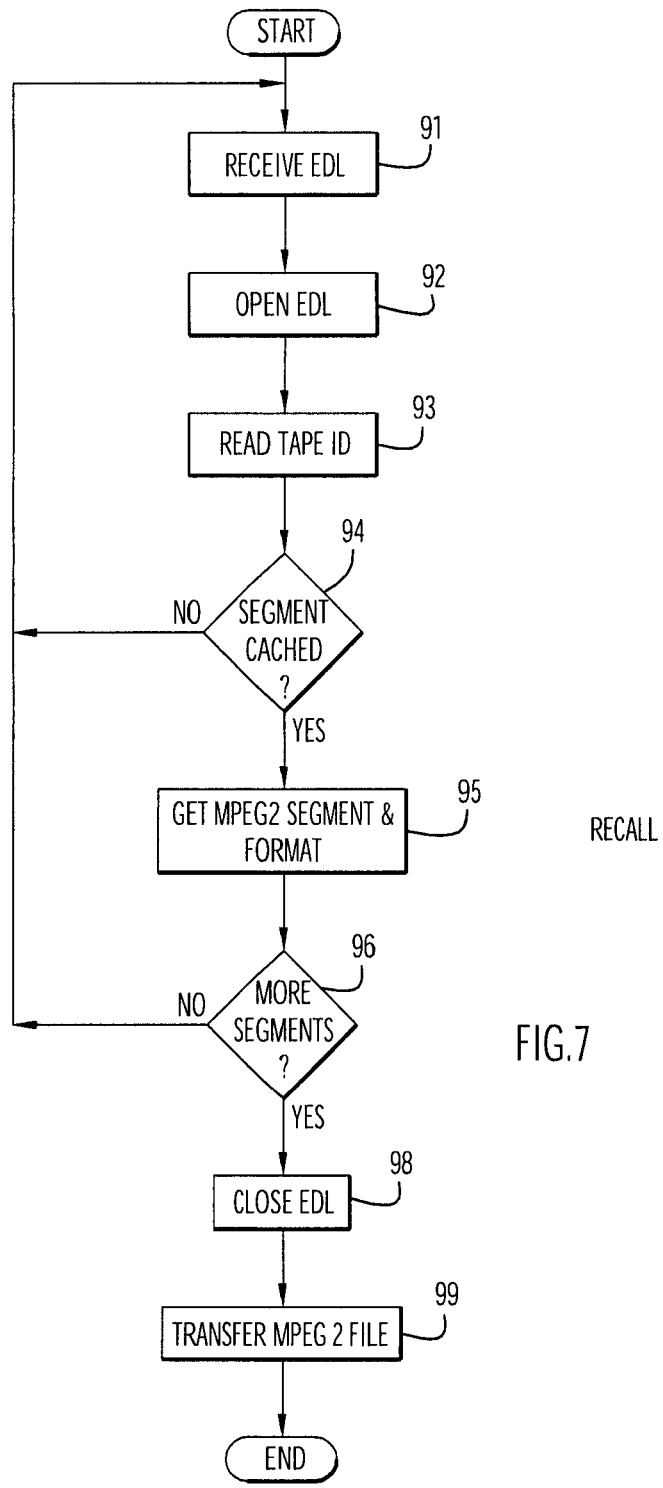

METHOD AND SYSTEM FOR SPECIFYING A SELECTION OF CONTENT SEGMENTS STORED IN DIFFERENT FORMATS

This is a continuation of application Ser. No. 09/829,676 filed Apr. 9, 2001 in the United States Patent and Trademark Office. The entire disclosure of the prior application, application Ser. No. 09/829,676 is hereby incorporated by reference.

FIELD OF INVENTION

This invention generally relates to digital archives, and more particularly, to the digitization, cataloging, storage, access, retrieval and editing of content such as video data.

BACKGROUND

Players in the multimedia industry such as producers of news or entertainment programs may have thousands of hours of video content at their disposal. For example, a well-known television entertainment program reports possession of 100,000 hours of video content and adds approximately 60 hours per week.

Such programming often demands that the video content be available for editing in a very short timeframe. For example, a first segment of an entertainment television program may already be airing while a second segment is still in production. In this fast-paced environment, fast access to the information becomes critical.

Unfortunately, video content currently exists on videotape in either analog or serial digital format, hampering efficient access and review of the video's contents. The degradation of the original analog recordings is an even greater concern. Storing the information in a digital archive permits faster access to the information and reduces the problem of degradation.

To meet production quality, the information must be digitized at a high or broadcast resolution. At high resolution, more bandwidth is required to retrieve information from the archive, resulting in a slower and/or costlier retrieval system. Accordingly, there is a need to provide a digitally based video editing system that permits quick access to content for editing, yet provides a high quality content stream suitable for televising.

Currently, there are various solutions available to provide some of the functions necessary to create a compilation of existing video content. However, no single solution exists to provide the functions of digitizing an existing video archive for preservation, segmenting the video to create storyboards for review, accessing the content efficiently for viewing and selection purposes, creating edit decision lists of video source, and producing production quality content from the created lists. Additional desirable features include augmentation of existing descriptive information of the content, and storage of descriptive information (a.k.a. metadata) for efficient searching.

It is also desirable to provide a web-based video editing system readily accessible to users.

DESCRIPTION OF THE DRAWING

FIG. 7 is a flow diagram representing the recall process.

SUMMARY OF THE INVENTION

Figure 1:
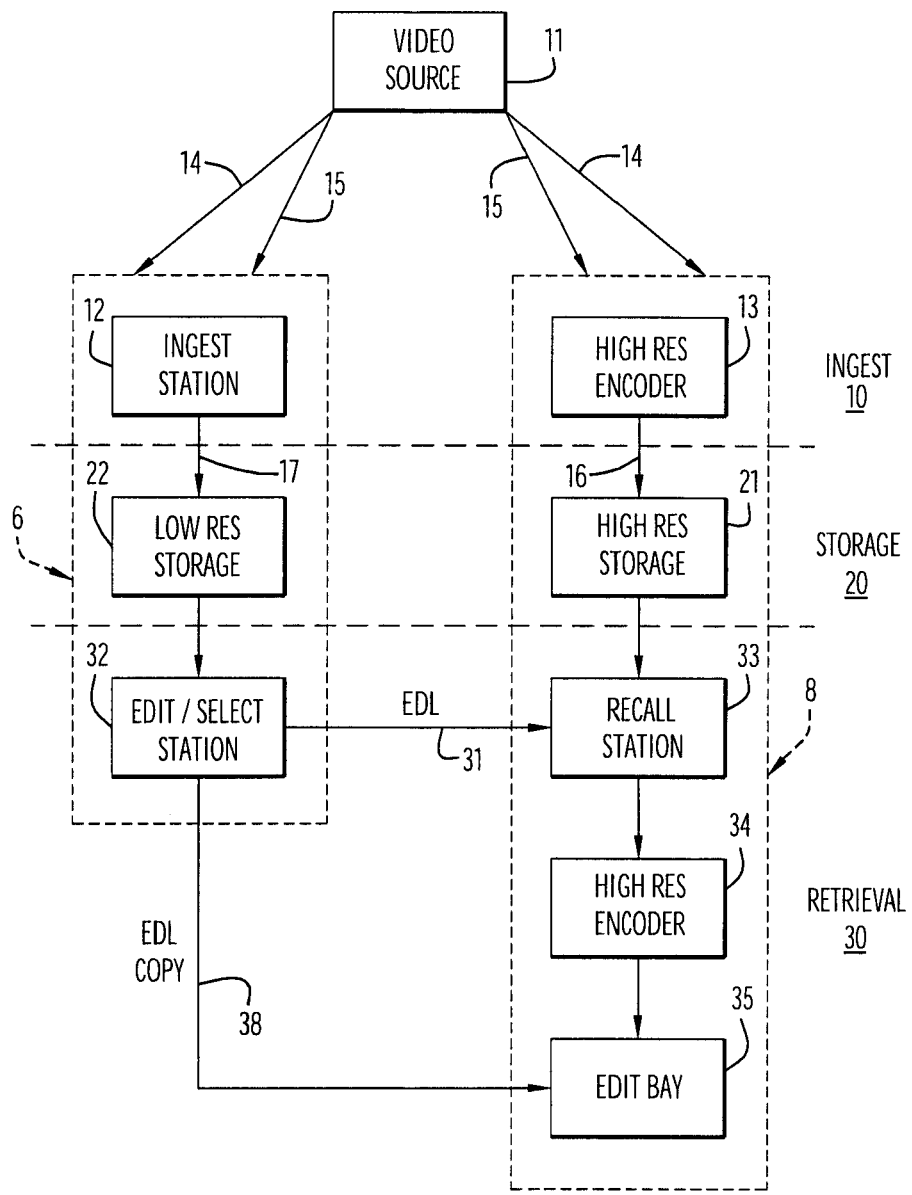
FIG. 1 is a block diagram representing the dual-path content management system of the present invention, including ingest, storage and retrieval stages.

The present invention provides an end-to-end solution for digitizing existing video content and editing the same to produce television programming or the like. Referring to FIG. 1, the system includes three main parts: ingest 10, storage 20, and retrieval 30. In order to provide fast access for editing as well as high quality content for production purposes, data flows through two parallel paths. One path, high resolution format path 8 shown on the right, stores 'full' resolution data for broadcast quality uses. The other path, low resolution format/meta data path 6 depicted on the left, stores a compressed video summary and text descriptions intended to facilitate the access and selection processes. The two paths are substantially independent, linked at the beginning by the video source 11, and during the retrieval process via EDL 31.

Ingest.

The ingest stage 10 handles the digitization of the incoming data from existing videotape content and optionally, may provide mechanisms for segmenting the video and augmenting any descriptive information already associated with the content. The video is encoded into both low resolution and high resolution formats by a low resolution encoder (not shown) residing in an ingest station 12 and a high resolution encoder 13. The low and high resolution content are then stored in separate files. In the present embodiment, the low resolution format used is MPEG1, and the high resolution format is MPEG2. The reformatted video may be annotated with meta data such as user input, legacy data, storyboards, and speech-to-text processing of the audio stream. Speech-to-text is supported for annotating the audio stream, but may be done as a separate step from the initial ingest when the recorded speech in the audio stream is being processed.

The MPEG1 and the metadata are used for proxy editing, i.e., to search and browse the video data for selection, while the MPEG2 is used for final editing and broadcast. As a result, the time codes between the MPEG1 and MPEG2 are synchronized.

The inputs to the ingest operation comprise: 1) the output 14 of a video source 11 such as a video tape recorder (VTR), including 2 audio input paths; 2) the output 15 of a time code generator, in this case within the high resolution encoder 13; and 3) any existing or legacy descriptive data. In the present embodiment, legacy descriptive data was batch-imported into an IBM DB2 database from a DOS Xbase legacy database. It may be provided from any existing customer archive, e.g., proprietary or standard archiving systems already in use.

The outputs from the ingest operation include: 1) an MPEG2 I-Frame only data stream 16, for example at 48 megabits per second (Mbps) nominal, providing the MPEG2 path; 2) an MPEG1 data stream, for example at 1.5 Mbps, for providing the MPEG1/meta data path; and 3) descriptive data including text files, attributes, and thumbnails, also for providing the MPEG1/meta data path, both indicated by arrow 17.

Storage.

Once the video is digitized and the descriptive data is collected and generated, the data is forwarded to the storage 20 system and stored in two main areas. The MPEG2 data is sent to an archival high resolution storage system 21 optimized for capacity and accessibility, such as a magnetic tape based system. The MPEG1 and descriptive data are stored on tape, and for fast access during editing the content of interest and metadata are cached on a low resolution storage system 22 such as a digital library with media streaming capability. In the present embodiment, the generally available IBM Content Manager product provides a digital library and integrated IBM Video Charger media streaming product.

The Content Manager 22 provides an interface for searching and browsing the video meta data. The thumbnails and text descriptions that are presented as part of the search results are stored on disk for fast access. The MPEG1 video is kept on a tape library system, buffered on disk, and accessed as needed via the Content Manager 22.

Retrieval. The retrieval stage 30 consists of two main parts: the edit/selection operation depicted by block 32 in MPEG1/meta data path 6, and the batch recall operation represented by recall station 33 in MPEG2 path 8.

The edit/selection operation 32 enables producers to search and browse the digitized archive and select segments for subsequent processing. Producers search the IBM Content Manager 22 or similar digital library product via text or attributes and get back a set of videos meeting the search criteria. Each video is represented by a thumbnail and a text description. By selecting a particular thumbnail, a producer can request to see the storyboard for the corresponding video. From the storyboard, the producer can then request to view the MPEG1 video of the scene. The video will begin playing at the scene selected within the storyboard.

As the producer reviews the data, he indicates which segments he would like to use by placing them into a candidate list. The producer is then able to order and trim the video segments in the candidate list to produce the output of the edit/selection operation; an Edit Decision List (EDL) 31.

The EDL 31 is sent to the batch retrieval operation 33 in MPEG2 path 8. The batch retrieval operation 33 uses the EDL 31 to retrieve the appropriate segments from the MPEG2 storage area 21. The data are retrieved from tape and sent to a Profile system 34 for subsequent transmission to an edit bay 35 for final editing.

Although the invention is described with an exemplary two paths for high and low resolution formats, the present embodiment includes three resolutions. Thumbnails are stored at an even lower resolution than the MPEG1 content, and are used in the selection and editing processes. Moreover, the generalized concept of the present invention easily extends to supporting multiple resolution formats. A user may use content stored in one or more lower resolution formats for selecting portions of content. The recall process can then retrieve corresponding portions of the selected content in any of the stored higher resolution formats for production using the principles taught by the invention.

DETAILED DESCRIPTION

The present invention will now be described with reference to a specific embodiment, and particularly to video content. It shall be understood, however, that various modifications and substitutions may occur to the skilled artisan that do not depart from the spirit and scope of the invention, and that the present invention is only limited by the full breadth and scope of the appended claims. Moreover, the invention is suitable for managing all types of content.

I. Ingest

The ingest operation 10 digitizes an incoming analog video stream 14, e.g., from existing videotapes or from live video feed, and collects descriptive information that may be provided, for example, from operator input, existing descriptions, or video image captures to create a storyboard and/or speech-to-text processing of the audio stream.

Ingest Hardware.

Figure 2A:
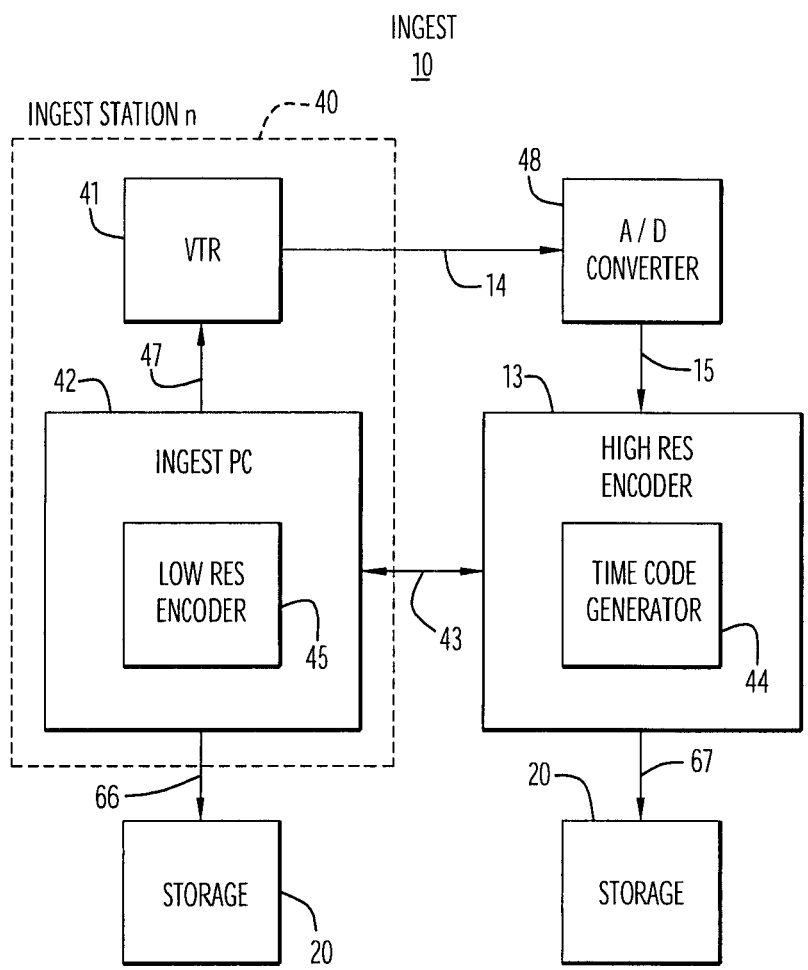
FIG. 2A is a block diagram representing the ingest stage.

Referring now to FIG. 2A, there are some number n of video ingest stations 40. In the present embodiment, four stations were provided, although more stations may be supported depending on network and server capacity.

Each station 40 consists of a video recorder (VTR) 41 connected to a PC based workstation 42 capable of linking to a network (in this case running Microsoft Windows NT). The workstation or Ingest PC 42 includes a low resolution encoder 45 and driving video cataloging software (described more fully below). In the present embodiment, the low resolution encoder is a PCI MPEG1 encoder card.

The station 20 includes a link 43 to a high resolution encoder 13. In the present embodiment, the link is an ethernet or RS422 connection and the high resolution encoder 13 comprises an MPEG2 encoder. Station 40 may also provide a control link 47 to the VTR, for example with another ethernet or RS422 connection.

The high resolution encoder 13 of the present embodiment supports encoding of multiple MPEG2 streams, so that one machine may service several of the video ingest units. The PCI cards for MPEG1 encoding and video processing in the present embodiment are compatible with scene detection and speech-to-text software (see below).

The station 40 interfaces with the high resolution encoder 13 to enable simultaneous conversion of the analog video stream to low and high resolution formats, in this case MPEG1 and MPEG2. Prior to being input to high resolution encoder 13, the analog stream 14 of the present embodiment is first passed to amplifier/splitter to noise reduction circuitry (not shown) and an analog to digital converter 48, thereby providing a serial digital stream 15 to high resolution encoder 13. Alternatively, some VTRs can provide a digital input directly to the encoder 13.

The high resolution encoder 13 of the present embodiment provides both MPEG2 encoding and decoding to reduce the probability of incompatibilities between different MPEG2 standards, although hybrid solutions may also be used. It also includes a digital-to-analog converter (not shown) and a time code generator 44. These are used to convert the digitized video stream back to analog and add timecodes to the images before providing them as input to low resolution encoder 45 over link 43.

As previously noted, the high resolution and low resolution streams 16, 17 need to be synchronized. The present embodiment uses timecodes to synchronize the two. However, although MPEG2 supports timecode, MPEG1 does not. Consequently, apparatus is provided for encoding the timecode in formats that do not support timecode natively. Time code generator 44 provides timecodes to high resolution encoder 13. The timecode generator 44 may be part of the high resolution encoder 13 as in the present embodiment. Alternatively, timecodes may be provided by the VTR itself or already be present in the video images. In the latter case, such timecodes are preferably continuous and monotonically increasing to enable synchronization.

The timecodes of the present embodiment comprise SMPTE timecodes. High resolution encoder 13 encodes the timecodes into the generated MPEG2 stream, and superimposes timecodes into the analog video images themselves e.g. by burning the timecodes using a timecode character generator. The timecodes are later extracted from a selected MPEG1 frame using, for example, optical character recognition (OCR) technology. In an alternative exemplary embodiment, timecodes are encoded as "watermarks" and later extracted by decoding apparatus. See, for example commonly assigned U.S. Pat. No. 5,825,892 to Braudaway et al., entitled "Protecting Images with an Image Watermark." As yet another alternative, timecodes may be extracted from the MPEG1 files by using proprietary MPEG1 encoders and integrating the proprietary MPEG1 standard of the encoders with Videocharger. Although in the present embodiment new timecodes were generated, preexisting noncontinuous timecodes of the video images were also supported and burned into the MPEG1 images because the customer had indexed to these timecodes.

Regardless of the MPEG1 solution used, the encoding process needs to ensure that the capture timecodes align as much as possible. The intent is to be as frame accurate as possible subject to the capabilities of the chosen hardware and software. In the present embodiment, a verification process occurs as follows. The user reviews a portion of the MPEG1 recording and is asked by the application to enter the timecode appearing on a current video frame as an input in an entry field. Alternatively, the application itself is automated to select a sample video frame, e.g., during thumbnail or storyboard generation, and detects its timecode (e.g., through OCR technology, watermark decoding, etc.) The software then looks up the MPEG1 frame number for the current frame. Then, if the system already knows the starting frame and timecode of the video, it can calculate a correspondence or "delta", into the metadata files associated with the MPEG2 files. Alternatively, another sample frame and corresponding timecode information are determined and the two calibration points are used to calculate the delta. This delta is later used to calculate an offset into the MPEG2.

Figure 2B:
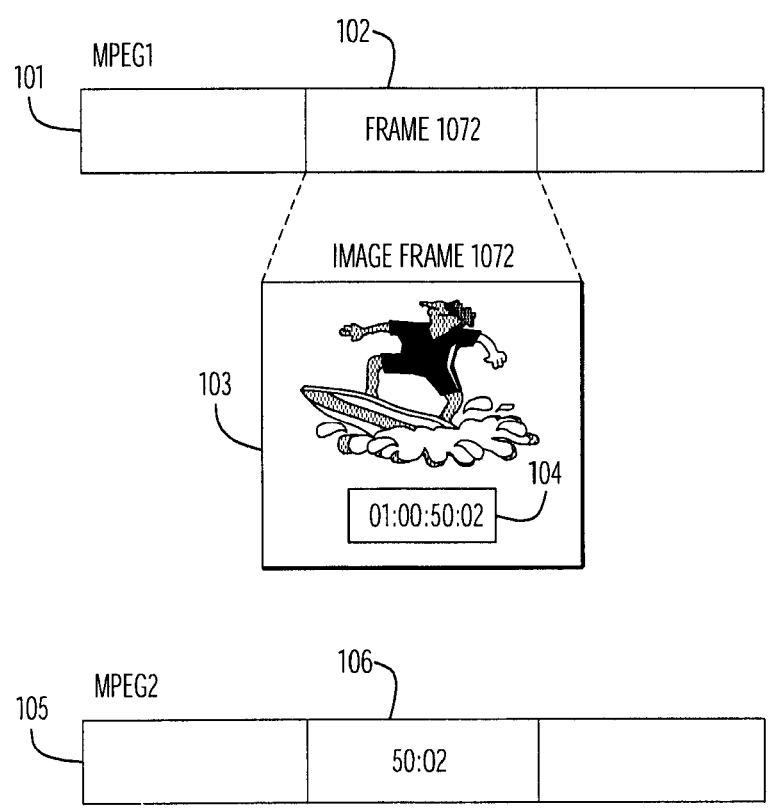
FIG. 2B is a representation of corresponding frames of a high resolution and a low resolution segment of content.

An example of corresponding segments of the MPEG1 and MPEG2 files is shown in FIG. 2B. A portion 101 of an MPEG1 1 file is represented. Within that segment 101 are a number of images, each associated with a frame number which in this case is stored with the metadata associated with the images. A representative image frame 102 is shown, and has a frame number 1072. An enlarged view 103 of the image frame is also shown. It includes a timecode 104 superimposed on the image frame. The representative timecode 104 reads "01:00:50:02", indicating that the image frame is 50 seconds and 2 frames into MPEG1 stream "01". By reading one or more such timecodes and knowing their corresponding frame numbers, the system is able to calibrate itself so that it can calculate the appropriate timecodes corresponding to any frame numbers. It can then find the corresponding frame 106 in the high resolution MPEG2 file 105.

The hardware used to implement the present embodiment of the invention comprised four IBM PC's, one MPEG2 encoder system (e.g. Profile XP) supporting 4 MPEG2 streams, four PCI MPEG1 encoder cards, and four 100 BaseT Ethernet adapters.

Ingest Software.

The ingest application software may be implemented in a number of ways. The software of the present embodiment consists of several customized and integrated modules: Microsoft Windows NT Workstation 4.0 w/service packs, Virage Video Logging Software w/SDK, IBM Content Manager V6.1, Java, C or C++ compiler compatible with Virage SDK (Java Runtime Environment 1.1.8 from IBM, and a custom IBM Ingest Application. The base of the software is provided by the Virage video logger and its Software Developer's Toolkit (SDK), although other software providing similar functions may be used. The ingest application uses the Virage SDK and supports the data model of the existing videotape archive. The application also provides user interfaces for user input, collects the descriptive information for each video and feeds it into a loader for the Content Manager 22. It further ensures that the MPEG1 and MPEG2 encoders are kept synchronized to the external time code. Content Manager 22 includes a library server, a text search server, Videocharger and a cliette.

Additional Software Database Functions.

In the present embodiment, several additional functions were incorporated into the new system. A Data Entry function permits a user to enter tape IDs, keywords, descriptions, and celebrity names. It is also possible to provide voice annotation using software such as Via Voice by IBM Corporation, or by mixing a microphone input with the audio input from the VTR 41. A Search function enables searching, e.g., by celebrity name or keyword. The search results are provided in the form of a result set of tape records. A Circulation Management function is provided for the physical tape collection. The system additionally supports check-in and check-out by tape number. The legacy library of the present embodiment manages one copy of each tape. Reports can be generated using standard database tools that are outside the scope of the system.

Ingest Process.

Figure 3:
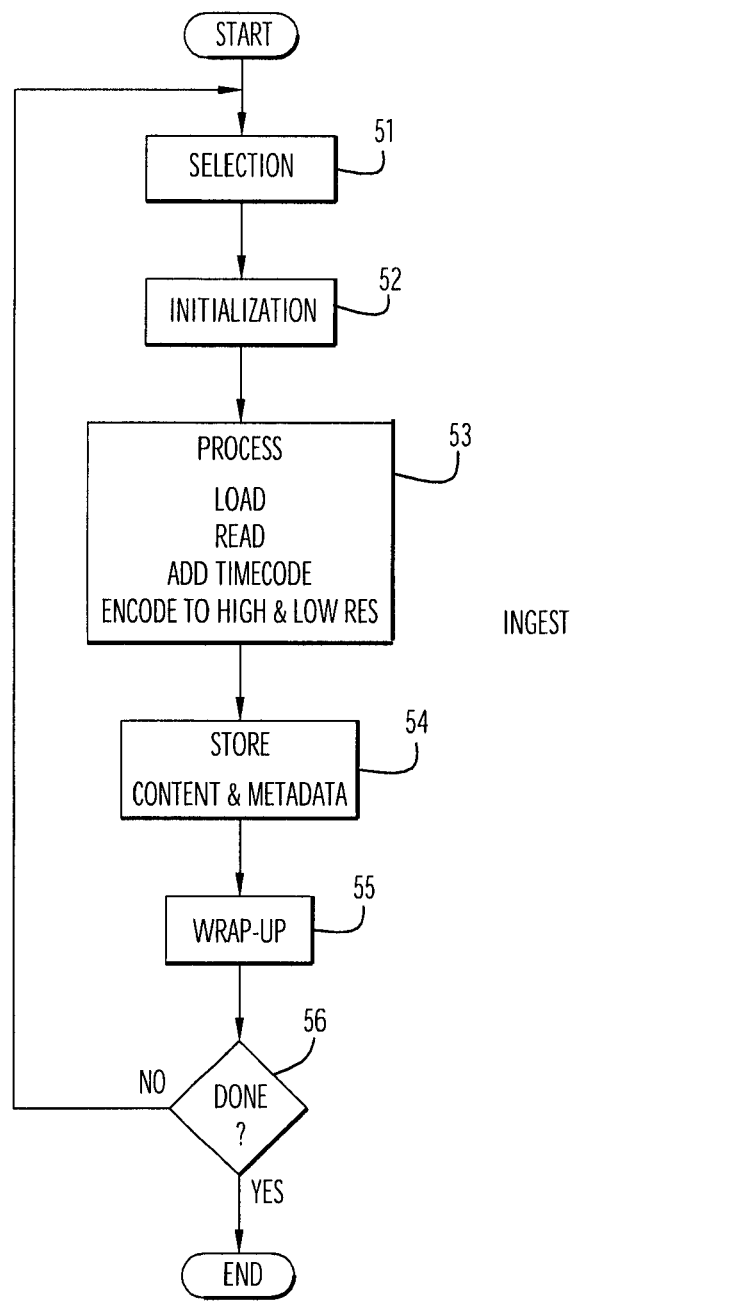
FIG. 3 is a flow diagram representative of the ingest process.

Referring now to FIG. 3, the following steps outline the processing of each video tape.

Selection 51.

An Ingest operator selects a tape from processing based upon predetermined selection criteria. For example, priority may be given to content stored on deteriorating media.

Initialization 52.

The unique tape identifier is entered into the Ingest application. The identifier will be used subsequently to query Content Manager to retrieve existing meta data associated with the tape content. The identifier will also be used as the basis for naming the items in CM and the MPEG2 files. The Ingest application will initialize the scene detect and MPEG1 encoding hardware on the Ingest PC. The application will also initialize the Profile MPEG2 encoder by supplying it with filename and destination location information.

Processing 53.

The ingest operator loads the tape into the tape player. Each videotape of the present embodiment is only read once, and the tape player output is sent to two separate inputs: the Ingest PC MPEG1 card and the Profile video format. Both encodings must share a consistent time code provided by a time code generator 44, as previously described.

After encoding, the MPEG2 stream is stored in a file residing on the Profile storage system. From there it is transferred to the MPEG2 storage system and onto magnetic tape. The Ingest PC and MPEG1 encoder produce an MPEG1 stream stored in a file digitized at 1.5 Mbps.

The meta data consists of several items: a storyboard, a primary thumbnail, text originally from the legacy database (optionally modified) used to store information about the video content, an audio track speech-to-text transcript, optionally a Microsoft Word or other word processing format transcript, and optionally a speech-to-text annotation. The meta data of the present embodiment is stored in such a way that it is associated with the MPEG1 file, since it will primarily be used for viewing and selection purposes. The Ingest application and its user interface facilitate collection of the meta data and hide the details of the disparate components interacting underneath.

Primary Thumbnail.

The primary thumbnail is initially represented by an icon determined from an attribute value. The specific icon values are determined as part of the detailed design. This icon can later be replaced with an image thumbnail via an editing interface. Users are also able to edit other metadata via this editing interface, as will be described in more detail subsequently.

Storyboard.

Scene detection technology within the video catalog software marks scene changes within the video and creates a thumbnail of the first frame of each scene. Alternatively, thumbnails may be captured at a fixed interval. For example, in the present embodiment, a thumbnail is created for every 30 seconds of video using an AVI encoder. The collection of these thumbnails forms a storyboard for the video. In the preferred embodiment, a webpage storyboard is built at the time the thumbnails are created, or otherwise as a background process, so that it can be immediately retrieved during the selection process.

Legacy Text.

The descriptive data originally loaded from the legacy database is displayed for operator review and editing.

Transcription. Speech-to-text technology within the video catalog software processes the audio stream in real-time to produce a text file of the audio content. This file is used for text searching. Closed caption encoding may also be captured if desired using alternative software, as the Virage software product does not support this function.

Some video assets also have transcripts in Word or other word processing formats. These transcripts, when available, are supplemental to the speech-to-text output and are also used as input for text searching. The Ingest application provides a place to specify any existing transcript files and expects the files to be accessible on the file system. Once these transcript files are loaded, the users is able to retrieve and print them from the editing interface, as will be described in more detail subsequently.

Speech-to-Text Annotation.

Optionally, an operator can annotate the video via verbal descriptions which will also be captured using speech-to-text technology. This annotation may be done subsequent to the completion of the speech-to-text capture.

Wrap-Up 55.

When the processing of a story has completed, the resulting files are ready for final disposition. The MPEG1 file, text meta data, thumbnails, storyboards and speech-to-text output are grouped together and presented to user for final review. The user may spot check the output for accuracy and quality before submitting the data for loading into the IBM Content Manager. At this point the user is able to further modify attribute data from the legacy database as well as determine whether the encoding quality is acceptable or needs to be repeated.

Once the end of the video tape is reached, the application is reset to its initial state and is ready for the next tape.

The Ingest operation must be able to process the video sufficiently quickly that the tape player can run continuously and each tape only be played once. The four-station ingest system of the present embodiment is designed to perform the ingest process 16 hours/day, 6 days/week at 4 ingest stations. Each station encodes 8-10 hours of video/day. Additional stations may be added as data throughput allows.

II. Storage

Storage capacity is an important aspect of the present invention. For example, to encode 100,000 hours of video in both 1.5 Mbps MPEG1 and 48 Mbps I-Frame only MPEG2 formats, the total solution requires over 2 petabytes of storage.

In order to efficiently encode, store and retrieve this content the storage not only requires sufficient capacity, but also must be able to efficiently transfer files from ingest to tape and to fulfillment. Moreover, fast access must be provided for the MPEG1 path, whereas slower access is tolerable for MPEG2 retrieval. Below are descriptions of the hardware and storage schemes for the present embodiment for both MPEG1 and MPEG2, although numerous storage architectures may be implemented to address the preceding needs.

Storage Area Network (SAN).

Figure 4:
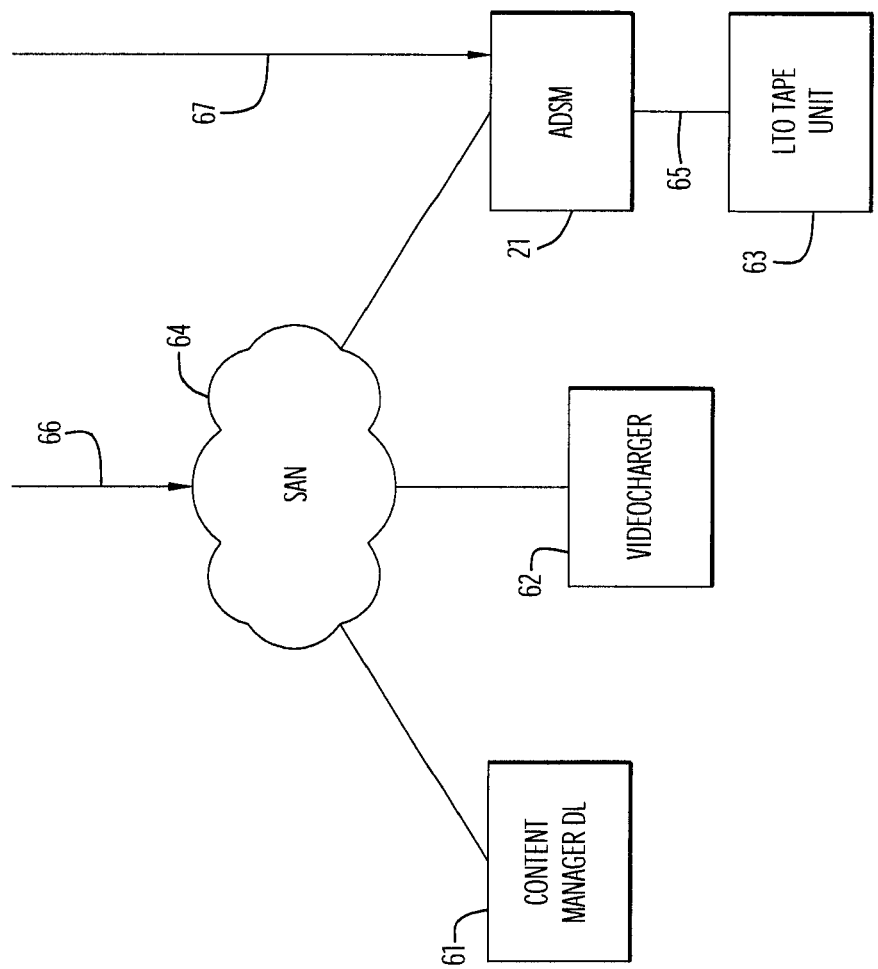
FIG. 4 is a block diagram representing the storage stage.

Referring to FIG. 4, the present embodiment provides a significant amount of disk storage for several systems on different platforms. Since large amounts of data move between the systems, a flexible, scalable, storage architecture was implemented. The 1.5 TB of storage comprises 700 GB IBM Videocharger on AIX 62, 200 GB IBM Content Manager digital library on AIX 61, and 600 GB provided by a Tivoli Storage Manager (TSM) 21 coupled to a Linear Tape-Open (LTO) Tape buffer 63, both on AIX. Additionally, 100 GB or more are available on the high resolution encoder 13.

A SAN device 64, here comprising a 7133-D40, consolidates the storage which interfaces to the systems via Serial Storage Architecture (SSA). The SAN device appears to the systems to be local disk drives. The SAN provides several significant advantages. For example, storage is allocated to the systems as needed, allowing efficient allocation of disk space. Systems do not run out of space and do not have excess space. A system's storage can be increased without opening it to add more drives. The SAN provides RAID, hot-swap, hot-standby, redundant component and performance monitoring capabilities. By externalizing the data, a system failure does not preclude access to the data. Externalized data facilitates high availability architectures.

Storage of MPEG1 Files and Meta Data.

The MPEG1 files and associated meta data passed to storage system 20 via link 66 and are stored in an IBM Videocharger Model 62 managed by the IBM Content Manager V6.1 22. As shown, the IBM Content Manager solution resides on two Model H50 R/6000 machines running AIX 4.3.2: one for the digital library portion 61 of the Content Manager and one for Videocharger 62.

Staging and buffering occur on disk. The LTO Tape Library 63 and TSM 21 are connected via an ultra-SCSI link 65 and are used for long term storage. A 1000BaseT Ethernet connection is also provided. Thumbnails and meta data used for search results are kept on disk to ensure efficient search times. The VC provides disk buffer capacity for 1000 hours of MPEG1 video available for immediate streaming. Additional video is staged from tape.

Storage of MPEG2.

The MPEG2 data of the present embodiment is stored on a R/6000 system running AIX and TSM. The high resolution encoder 13 is connected to TSM via a fibre channel connection. Initial staging and buffering is to disk with an LTO tape library 63 for long term storage.

III. The Edit/Selection Operation

Figure 5:
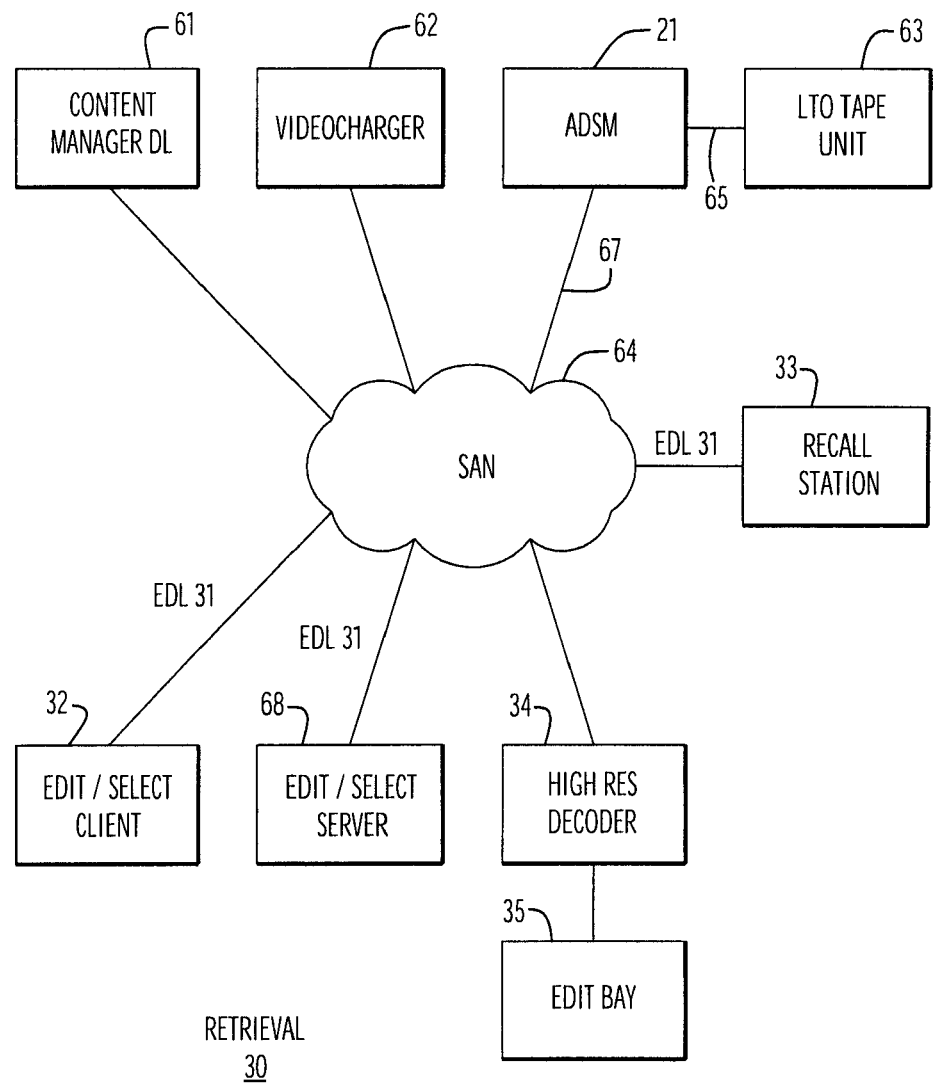
FIG. 5 is a block diagram representing the storage and retrieval stages.

The Edit/Selection operation is part of the retrieval process 30 shown in FIG. 5. A video editing system is hosted on one or more servers 68 and can therefore operate without custom software on the edit/selection client machines 32. A plurality of edit/selection stations 32 are provided to facilitate the location, review and selection of archived video assets. This web-based system enables collaboration between video editors, allowing them to share sets of video clips. It also allows multiple users to share the same collection of video storage hardware 20, video content, video processing hardware 34, and video software.

A producer searches content via, for example, text strings and keywords, and then reviews the returned thumbnails, text descriptions and storyboards to narrow down his selections. Once sufficiently narrowed, he can view the MPEG1 video to make final decisions on which segments to use. Selected segments are then placed in a candidate list for use in generating an EDL. The producer is able to view, select, trim and order segments from the candidate list to produce the final EDL 31. At any point in this process, the producer can preview the current EDL. The resulting EDL is sent to the high resolution recall process 33 over SAN 64 and used as a reference for indicating which MPEG2 files are to be recalled from tape.

The search, browse and EDL creation operations of the present embodiment are provided via a combination of Web, Java, and/or C applications, for example. The final EDL 31 format may be tailored to the needs of the user, which in turn may depend, for example, upon the existing user applications. The EDL 31 consists of a simple non-hierarchical list of video segments with file names and start and stop timecodes.

Edit/Select Hardware.

The Edit/Selection stations 32 each consist, for example, of personal computers running Windows 98 and a Web browser with Java 1.1.8 capability. Depending on the software chosen, additional PCI cards may be included. In the present embodiment, 25 stations are configured to run Edit/Select operations concurrently.

Edit/Select Software.

The Edit/Selection station 32 software integrated several underlying components, including Internet Explorer V5.0, Java Runtime Environment 1.1.8, IBM's Net.Data and MPEG1 Player. In the present embodiment, the search functions are all web based via Net.Data while the video selection is made with a modified version of the VideoCharger Player running locally.

The edit/selection software provides a user interface and several underlying functions for allowing the user to perform text-based searches, review the results, select segments therefrom, generate EDL's and then send final EDL's to the MPEG2 recall operation 33. A diskette-based distribution of the EDL is also supported for standalone Edit Bays 35.

EDL's 31 are saved on the web server 68, so that they can be shared with other users. They may also be access-protected so that other users can be restricted from accessing or modifying them.

Additional functions of the edit/selection software allow users to search the archive and update the metadata associated with each video. In particular, users are able to replace thumbnails, and modify legacy attribute data and text sources produced from speech-to-text annotation and video analysis. Text is modified, for example, via keyboard input. The search client is an application connecting to the Content Manager digital library 61 and Videocharger 62.

Edit/Select Operation.

Figure 6A:
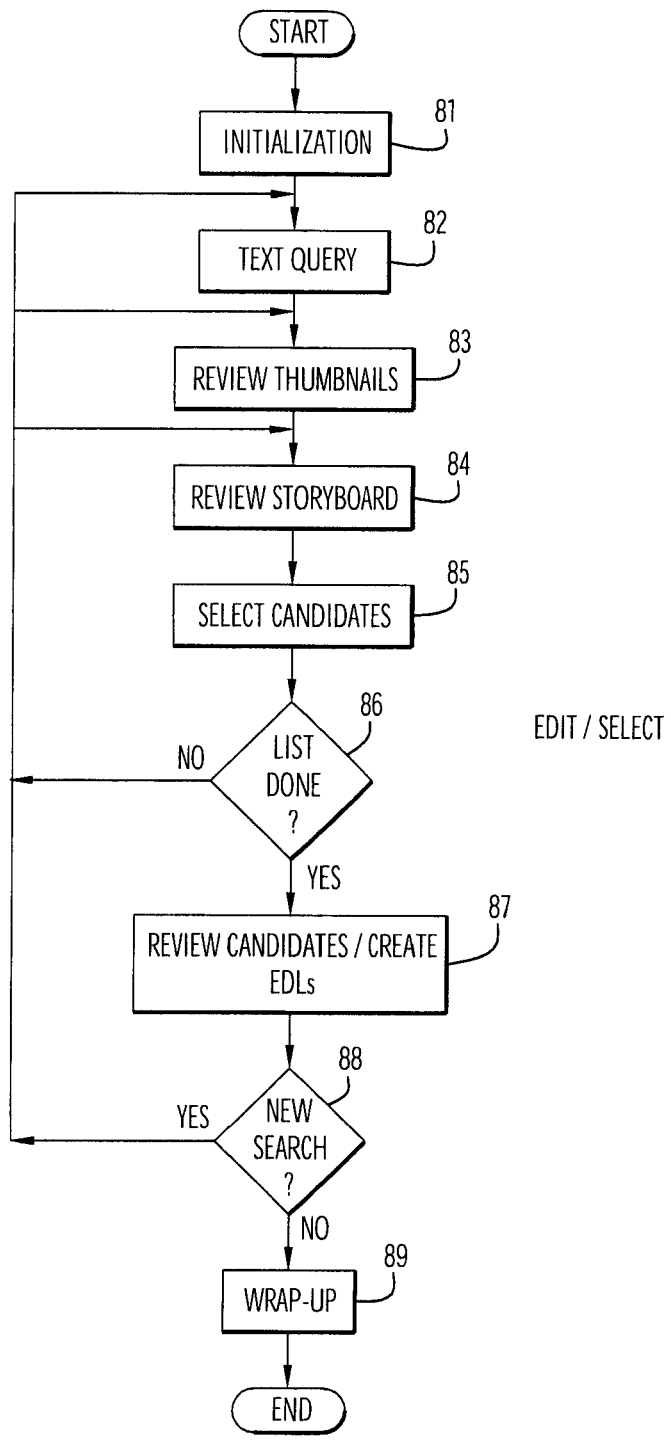
FIG. 6A is a flow diagram representing the edit/selection process.

The Edit/Selection process will now be described with reference to FIG. 6A.

Initialization 81.

At initialization, the program performs functions such as clearing the current EDL and requesting a job identifier string known as a storyslug as input. The storyslug is used to coordinate the activities between the Edit/Selection operation, the MPEG2 recall process 33, and the edit bay 35.

Text Query 82.

The producer starts by entering words or phrases representative of the subject he is looking for. This input is used to create a query that is sent to Content Manager 22 for processing. Content Manager 22 returns a set of candidates ranked by how closely they match the query. Each candidate is represented by a thumbnail and includes the descriptive text entered at Ingest 10. Because of the size of the text, a subset of the candidates may be presented with additional pages as needed. Alternative formats are also possible.

The exact implementation the text query and search results are dependent on the underlying data model that is used within CM. The data model and user interface specifics, in turn, depend on customer requirements.

Staging (Pre-Fetch) Video for Expected Use.

When it is known that there will be demand for content on a particular topic, all the material on this topic will need to be readily available. To facilitate this, producer or librarians perform searches on the topics to stage the corresponding video for expected use. They are not interested in playing this video at this time, but rather only recalling it from tape to disk for fast future access. Therefore the edit/selection process of the present embodiment supports both play and stage or fetch requests. The play operation plays the video in the MPEG1 Player, while the stage operation only fetches the video into a Videocharger staging area. In the present embodiment, there is capacity for 1000 hours of MPEG1 video on disk, although more may be added depending on user requirements.

Review Thumbnails 83.

The producer reviews the thumbnails and descriptive data and decides which candidates warrant further investigation. He clicks on the thumbnail to select it for further processing. This creates a storyboard. The storyboard consists of the set of thumbnails that were captured for this videotape. As soon as a storyboard is requested, the associated video file will is staged to the Videocharger server 62 for faster viewing should the producer choose to view the MPEG1 video.

Review Storyboard 84.

The storyboard appears as a series of thumbnails each of which represents scenes in the video (as determined previously by the Ingest video logging software). If the storyboard leads to continued interest, the producer clicks on the relevant section to trigger the Player for the MPEG1. The Player fetches the video from the VC server and begins playing the video at the selected section.

Select Candidates 85.

The Player loads and begins playing the MPEG1 video at a point consistent with the thumbnail in the storyboard. The producer can play the video or can jump to specific locations and play from there. He decides which section of video is of interest, marks its start and stop times and adds the section to the candidate list within the Edit/Select client 32. He can then mark additional sections in the same tape, or, as represented by decision diamond 86, he can return to the storyboard review step 84 to jump to a new section, return to the thumbnail review step 83 or form a new text query at step 82. Once the candidates have been selected for the current storyslug, he proceeds to the MPEG1 Review and EDL creation step 87.

Review MPEG1/Create EDL's 87.

The MPEG1 Review and EDL creation step 87 provides the ability to view, select, trim, and sequence video sections in the candidate list. When complete, the resulting EDL is converted to the standard format EDL agreed upon.

The Edit/Select Client 32 provides a graphical user interface to choose a video from the candidate list, play it using the Player, mark one or more start and stop times in the form of beginning and ending frame numbers, then add it to the EDL. The start and stop times can be set using the mark buttons on the player or by filling in two SMPTE (time code) fields, for example. Once done with one video, another is chosen and marked until all the desired videos are added to the EDL. The videos in the EDL can then be reordered, removed or changed.

Figure 6B:
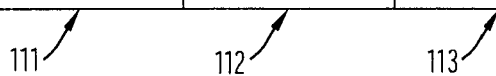
FIG. 6B is a representation of an edit decision list.

An exemplary EDL 15 is shown in FIG. 6B. It is essentially a list of selected video segments identified by video ID number (column 111), starting marker (column 112), and ending marker (column 113). The starting and ending markers may be represented by frames which are later converted into their corresponding timecodes. Alternatively, they may be represented by the timecodes themselves, as either read or calculated.

Throughout this process the EDL can be played back in Preview Mode. If it does not look satisfactory, the above process can be repeated until the EDL is finalized. Additionally, if other video segments need to be added to the candidate list, the producer can perform additional searches, as indicated by decision diamond 88, and add more segments to the existing candidate list.

Several functions provided by the MPEG1 player include, but are not limited to: play, stop, pause, frame forward, frame backward, jump to a location, mark start, and mark stop. Additionally, a slider control is provided to facilitate movement to various parts of the video.

Wrap-Up.

Once the EDL creation is complete the producer can request to save and optionally submit the resulting EDL. At this time the following occurs: the EDL is converted to the standard EDL format agreed upon, the EDL is saved to disk or the Content Manager server 61, for example, for reviewing and modifying at a later time. Upon submission, the EDL 31 is sent to the MPEG2 recall facility 33 so that the corresponding MPEG2 video segments can be retrieved from the archive and sent to the Profile decoding machine 34. A copy 38 is also sent to the edit bay 35, e.g., on diskette. The application then initializes itself and is ready for the next job.

IV. The MPEG2 Recall Operation

Referring to FIGS. 5, 6B and 7, the MPEG2 Recall station 33 receives the EDL 31 from the Edit/Selection station 32 in a first step 91 of FIG. 7. Based on the contents, the Recall station 33 initiates the recall of the MPEG2 files from tape 63 to storage on disk 21, as indicated by step 92. The starting and ending markers of each video segment in the EDL are used to calculate byte offsets into the MPEG2 files residing on tape. According to the present embodiment, only the desired part of the file is retrieved from tape 63 in order to increase system performance. This sub-file retrieval operation is supported within the TSM client 21.

The segment with handles is reformatted into a valid Profile MPEG2 format file. Station 33 then oversees proper delivery of the MPEG2 to the Profile Decoding Machine 34.

Recall Hardware.

The MPEG2 Recall Station 33 of the present embodiment is a PC running Windows NT coupled to an IBM PC Server via 1000BaseT Ethernet connectivity. It includes apparatus for extracting the timecodes from the low-resolution video segments specified in EDL's. It also includes a fibre channel card, example Interphase 5527.

Recall Software.

The MPEG2 Recall Software comprises custom software written by IBM and providing the previously described recall station function.

MPEG2 Recall Operation.

The MPEG 2 retrieval operation will now be described with reference to FIG. 7.

File Receipt 91.

The Recall system 33 receives the EDL 31 from a server 68 coupled to the Edit/Selection station 32.

File Processing.

The application opens the EDL file 92 and reads the tape identifier for each segment 93. In a next step 94, the application checks the storage buffer to see if the file segment is already buffered. If it is buffered, then the process returns to step 93 and the ID of the next EDL segment is read. If the segment is not buffered, then in a next step 95 the application uses the TSM API to request a partial object recall of the proper file segment from the MPEG2 storage area, and upon receipt, modifies the data to make the segment a valid MPEG2 file in the same format as stored. As previously noted, only the relevant segment and some additional buffer are retrieved from tape. This process continues until all segments of the EDL have been retrieved, as indicated by step 96.

Wrap-Up.

When all MPEG2 files segments have been recalled, the EDL file is closed 97. The MPEG2 files are then transferred in a next step 99 to a Profile decoder 34, for example via file transfer protocol over a fibre channel connection.

V. Profile/Edit Bay

Referring back to FIG. 5, the Profile decoding machine 34 reads the MPEG2 file from its disk, converts it to MJPEG and sends the digital output to the Edit Bay 35 for final editing. A producer accesses the files put on the Profile by the MPEG2 Recall operation.

Hardware.

The profile decoder 34 of the present embodiment comprises an MPEG2 decoder 34 with a multi-channel hard drive controller and the Edit Bay station 35 comprises a PC which exercise control over the decoder 34.

In conclusion, the system described provides an efficient, end-to-end content editing and production solution

What is claimed is:

1. A method comprising:
   building a list comprising a starting mark and an ending mark for a portion of a first content stored in a first format, the list for use in accessing a corresponding portion within a second content stored in a second format, the starting mark and the ending mark further comprising frame numbers;
   converting the starting mark and the ending mark into timecodes;
   associating, using the frame number of the starting mark, the frame number of the ending mark, and the timecodes, appropriate timecodes to corresponding frame numbers of the portion of the first content;
   determining offsets, based on the appropriate timecodes, between the starting mark of the portion of the first content and a starting mark of the corresponding portion of the second content and between the ending mark of the portion of the first content and an ending mark of the corresponding portion of the second content; and
   synchronizing the first content stored in the first format and the second content stored in the second format based on the offsets.

2. The method of claim 1, wherein the first content includes timecodes superimposed on its frames, and the method further comprises the step of first determining a correspondence between frame numbers and timecodes of the first content and using the determined correspondence to convert the starting mark and the ending mark into timecodes.

3. The method of claim 1, wherein the timecodes are extracted from the first content.

4. The method of claim 1, wherein the first content includes timecodes superimposed on its frames, and wherein the timecodes are calculated by determining a correspondence between frame numbers and timecodes of the first content and using the determined correspondence to calculate timecodes for the beginning and ending frames of the portion of the first content.

5. The method of claim 1, wherein the second format is different than the first format.

6. The method of claim 1, wherein the starting mark of said corresponding portion of said second content comprises a timecode.

7. The method of claim 1, wherein said offset is a time difference.

8. The method of claim 7, wherein said synchronization uses said offset to calibrate said first content and said second content.

9. The method of claim 1, wherein the first content is stored in a first storage medium and the second content is stored in a second storage medium wherein the second storage medium is a slower access storage medium than the first storage medium.

10. The method of claim 1, wherein the first content is a low resolution content and the second content is a high resolution content.

11. The method of claim 1, wherein the list comprises starting marks and ending marks of a plurality of portions of the first content.

12. A non-transitory computer-readable storage medium containing instructions executable by a computer, the instructions causing the computer to execute the steps of:
building a list comprising a starting mark and an ending mark for a portion of a first content stored in a first format, the list for use in accessing a corresponding portion within a second content stored in a second format, the starting mark and the ending mark further comprising frame numbers;
converting the starting mark and the ending mark into timecodes;
associating, using the frame number of the starting mark, the frame number of the ending mark, and the timecodes, appropriate timecodes to corresponding frame numbers of the portion of the first content;
determining offsets, based on the appropriate timecodes, between the starting mark of the portion of the first content and a starting mark of the corresponding portion of the second content and between the ending mark of the portion of the first content and an ending mark of the corresponding portion of the second content; and
synchronizing the first content stored in the first format and the second content stored in the second format based on the offsets.

13. The non-transitory computer-readable storage medium of claim 12, wherein the first content includes timecodes superimposed on its frames, and the instructions further causing the computer to execute the step of first determining a correspondence between frame numbers and timecodes of the first content and using the determined correspondence to convert the starting mark and the ending mark into timecodes.

14. The non-transitory computer-readable storage medium of claim 12, wherein the timecodes are extracted from the first content.

15. The non-transitory computer-readable storage medium of claim 12, wherein the first content includes timecodes superimposed on its frames, and wherein the timecodes are calculated by determining a correspondence between frame numbers and timecodes of the first content and using the determined correspondence to calculate timecodes for the beginning and ending frames of the portion of the first content.

16. The non-transitory computer-readable storage medium of claim 12, wherein the second format is different than the first format.

17. The non-transitory computer-readable storage medium of claim 12, wherein the starting mark of said corresponding portion of said second content comprises a timecode.

18. The non-transitory computer-readable storage medium of claim 12, wherein said offset is a time difference.

19. The non-transitory computer-readable storage medium of claim 18, wherein said synchronization uses said offset to calibrate said first content and said second content.

20. The non-transitory computer-readable storage medium of claim 12, wherein the first content is stored in a first storage medium and the second content is stored in a second storage medium wherein the second storage medium is a slower access storage medium than the first storage medium.

21. The non-transitory computer-readable storage medium of claim 12, wherein the first content is a low resolution content and the second content is a high resolution content.

22. The non-transitory computer-readable storage of claim 12, wherein the list comprises starting marks and ending marks of a plurality of portions of the first content.

23. A system comprising:
one or more hardware processors; and
a memory,
wherein the one or more hardware processors are configured to:
build a list comprising a starting mark and an ending mark for a portion of a first content stored in a first format, the list for use in accessing a corresponding portion within a second content stored in a second format, the starting mark and the ending mark further comprising frame numbers;
convert the starting mark and the ending mark into timecodes;
associate, using the frame number of the starting mark, the frame number of the ending mark, and the timecodes, appropriate timecodes to corresponding frame numbers of the portion of the first content;
determine offsets, based on the appropriate timecodes, between the starting mark of the portion of the first content and a starting mark of the corresponding portion of the second content and between the ending mark of the portion of the first content and an ending mark of the corresponding portion of the second content; and
synchronize the first content stored in the first format and the second content stored in the second format based on the offsets.

24. The system of claim 23, wherein the first content includes timecodes superimposed on its frames, further comprising a software means for determining a correspondence between frame numbers and timecodes of the first content and using the determined correspondence to convert the starting mark and the ending mark into timecodes.

25. The system of claim 23, further comprising detection apparatus for extracting timecodes from the first content.

26. The system of claim 23, wherein the first content includes timecodes superimposed on its frames, and further comprising a software means for calculating the timecodes by determining a correspondence between frame numbers and timecodes of the first content and using the determined correspondence to calculate timecodes for the beginning and ending frames of each of the selected portions.

27. The system of claim 23, wherein the second format is different than the first format.

28. The system of claim 23, wherein the starting mark of said corresponding portion of said second content comprises a timecode.

29. The system of claim 23, wherein said offset is a time difference.

30. The system of claim 29, wherein said synchronization uses said offset to calibrate said first content and said second content.

31. The system of claim 23, wherein the first content is stored in a first storage medium and the second content is stored in a second storage medium wherein the second storage medium is a slower access storage medium than the first storage medium.

32. The system of claim 23, wherein the first content is a low resolution content and the second content is a high resolution content.

33. The system of claim 23, wherein the list comprises starting marks and ending marks of a plurality of portions of the first content.

\* \* \* \* \*